United States Patent
Favero et al.

(10) Patent No.: US 10,526,525 B2
(45) Date of Patent: Jan. 7, 2020

(54) METHOD FOR DIVERTING AN UNDERGROUND FORMATION

(71) Applicant: S.P.C.M. SA, Andrezieux Boutheon (FR)

(72) Inventors: Cédrick Favero, Saint Romain le Puy (FR); Olivier Braun, Saint Bonnet les Oules (FR); Thierry Leblanc, Saint Heand (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 59 days.

(21) Appl. No.: 15/564,658

(22) PCT Filed: Apr. 8, 2016

(86) PCT No.: PCT/EP2016/057840
§ 371 (c)(1),
(2) Date: Oct. 5, 2017

(87) PCT Pub. No.: WO2016/162532
PCT Pub. Date: Oct. 13, 2016

(65) Prior Publication Data
US 2018/0086966 A1 Mar. 29, 2018

(30) Foreign Application Priority Data
Apr. 10, 2015 (EP) .................................. 15163252

(51) Int. Cl.
| C09K 8/508 | (2006.01) |
| C08F 220/58 | (2006.01) |
| C08F 290/06 | (2006.01) |
| E21B 43/25 | (2006.01) |

(52) U.S. Cl.
CPC .......... *C09K 8/5083* (2013.01); *C08F 220/58* (2013.01); *C08F 290/062* (2013.01); *C09K 8/508* (2013.01); *E21B 43/25* (2013.01)

(58) Field of Classification Search
CPC ........ E21B 43/267; E21B 43/26; E21B 43/25; E21B 43/04; E21B 43/02; E21B 43/2405; C09K 8/035; C09K 8/80; C09K 8/805; C09K 8/62; C09K 8/685; C09K 2208/08; C09K 8/588; C09K 8/68; C09K 8/887; C09K 8/90; C09K 2208/26; C09K 8/602; C09K 8/514; C09K 8/52; C09K 8/64; C09K 8/70; C09K 8/725; C09K 8/88; C09K 8/882; C09K 8/92; C09K 2208/24; C09K 2208/32; C09K 8/42; C09K 8/5083; C09K 8/5086; C09K 8/512; C09K 8/5753; C09K 8/584; C09K 8/60; C09K 19/38; C09K 2208/10; C09K 2208/28; C09K 8/03; C09K 8/08; C09K 8/10; C09K 8/20; C09K 8/206; C09K 8/24; C09K 8/40; C09K 8/487; C09K 8/50; C09K 8/502; C09K 8/516; C09K 8/528; C09K 8/536; C09K 8/56; C09K 8/5758; C09K 8/58; C09K 8/72; C09K 8/82; C09K 8/885; C09K 8/905; C09K 8/508
See application file for complete search history.

(56) References Cited

U.S. PATENT DOCUMENTS

| 2003/0004258 A1* | 1/2003 | L'Alloret | A61K 8/91 524/500 |
| 2010/0081586 A1* | 4/2010 | Smith | A61K 8/731 507/213 |
| 2012/0073809 A1 | 3/2012 | Clum et al. | |
| 2013/0233546 A1 | 9/2013 | Liang et al. | |
| 2014/0213748 A1 | 7/2014 | Blondel | |
| 2014/0378639 A1 | 12/2014 | Blondel et al. | |
| 2015/0191677 A1 | 7/2015 | Blondel | |

FOREIGN PATENT DOCUMENTS

| EP | 0583814 | * | 8/1994 |
| FR | 2985727 A1 | | 7/2013 |
| WO | 2011/077337 A2 | | 6/2011 |
| WO | 2011/081547 A1 | | 7/2011 |
| WO | 2011/148110 A1 | | 12/2011 |
| WO | 2014/047243 A1 | | 3/2014 |

OTHER PUBLICATIONS

International Search Report (and English Translation thereof) and Written Opinion issued in PCT/EP2016/057840, dated May 30, 2016.

* cited by examiner

*Primary Examiner* — Kumar R Bhushan
(74) *Attorney, Agent, or Firm* — Heslin Rothenberg Farley & Mesiti P.C.

(57) ABSTRACT

A method for diverting an underground formation comprises injecting, into the underground formation, an aqueous solution containing at least one heat-sensitive copolymer of a) at least one water-soluble monomer having at least one unsaturated function capable of being polymerized to form a water-soluble backbone, and b) at least one macromonomer of formula (I)

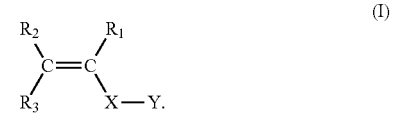

20 Claims, 1 Drawing Sheet

METHOD FOR DIVERTING AN UNDERGROUND FORMATION

CROSS REFERENCE TO RELATED APPLICATIONS

This application is a national stage filing under section 371 of International Application No. PCT/EP2016/057840, filed on Apr. 8, 2016, and published on Oct. 13, 2016 as WO 2016/162532, which claims priority to European Application No. 15163252.8, filed on Apr. 10, 2015. The entire contents of each of said applications are hereby incorporated herein by reference.

The invention relates to a method for diverting underground oil-bearing formations. This method implements a solution comprising a heat-sensitive copolymer which allows a temporary diverting gel to be formed within the underground formation.

The present invention also relates to a treatment method of an underground formation implementing this diverting gel prior to treatment operations.

PRIOR ART

The injection of viscous or gelled polymeric solutions into underground formations constitutes a practice that has been widely used for many years in order to improve the recovery of hydrocarbons (from oil and gas). These polymeric solutions are notably used to reduce or eliminate the permeability of an area or part of an underground formation.

These polymeric solutions, once in their gelled form, are used to divert the flow of water or gas towards less permeable areas by permanently blocking highly permeable areas. The blocking of certain areas may indeed become necessary given that they may be at the origin of water infiltrations, which seriously affect the recovery of hydrocarbons.

These polymeric solutions may also be used in diverting techniques. These techniques are used among others in drilling operations, well workover, well completion, stimulation, tertiary recovery and any sort of well treatment (biocide, anti-deposition, anti-corrosion, etc.). In particular, gels may help to carry out localized well treatments, by diverting from areas in order to allow the treatment of other areas, for example, using a treatment fluid (e.g. acid treatment for carbonate cracking, sand consolidation, etc.). In this case, the gel temporarily blocks the targeted highly permeable areas. This temporary blockage enables the treatment liquid to be diverted to the area to be treated despite its less favorable initial permeability or wettability. To achieve this, the gel must be both stable in the well throughout the entire treatment duration but it must also be able to be quickly removed after said treatment. Finally, it must be readily injectable, easy to position relatively far from the reservoir-borehole interface if necessary.

A large number of documents relating to diverting gels have been published over recent years. The majority of the proposed solutions are based on in situ cross-linking of a polymer, of the partially hydrolyzed polyacrylamide-type or polysaccharides, via the use of metallic cross-linking agents (Cr, Al, Zr, etc.) or organic cross-linking agents (hexamethylenetetramine, terephthaldehyde, phenol, formaldehyde). Cross-linking kinetics are slowed down in order to allow the injection of a fluid solution at a suitable position. In the literature the use of monomeric solutions containing an initiator has even been reported, to cause polymerization, and consequently the formation of the gel, directly in the bottom of an underground formation (WO 2011/081547).

Solutions that may be envisaged at this stage are the generation of radicals for radical polymerization, via one or more initiator(s) such as persulfate or a redox couple. The main difficulty resides in the fact that these initiators must be present in the gelling solution from the start, in order to be active within the product. In this respect, some technologies, often complicated, linked to encapsulation have been envisaged (WO 2011/077337). Problems encountered are chromatographic separations of the components or differential adsorptions, making cross-linking or polymerization less controlled, or even random.

In any case, diverting gels based on strongly thickening or viscosifying polymers must be destroyed at the end of treatment, so that the treated underground formation reverts to its original permeability after the diversion.

The injection of an enzyme or oxidizing agent is used, but it may be difficult for these to fully penetrate the gel formed, which leaves the treated area damaged.

To promote the breaking down of the polymer, work has also been initiated around hydrolyzable chemical functions in the cross-linking agent (for example, PEG diacrylate in document US 2013/0233546).

Information available in the literature shows that the diverting gels currently used require complicated technologies in order to break the gel. Furthermore, these technologies do not guarantee that complete degradation will be achieved. Possible polymer residues may indeed persist and thus reduce the permeability of the underground formation.

The problem that the present invention proposes to solve is that of developing a method for diverting areas of high permeability, which will not result in chromatographic separations of the components and that will not damage the permeability of the underground formation after a defined time. The present invention will in fact allow the initial permeability of the underground formation to be reestablished, at the end of the diversion treatment. In contrast to methods in the prior art, no intervention or post-treatment is necessary in order to restore the initial permeability.

DESCRIPTION OF THE INVENTION

The present invention relates to a method for diverting an underground formation or oil-bearing rocks/drilling areas, by means of polymers capable of forming temporary diverting gels in situ. This diversion allows potentially heterogeneous or damaged underground formations to be treated. Said polymers are capable of breaking down without intervention or post-treatment. The stability of the gel is however sufficient to enable successful treatment of the formation, for the necessary duration.

More precisely, the present invention relates to a method for diverting an underground formation including at least one step of injecting into the underground formation an aqueous solution comprising at least one heat-sensitive copolymer of:
  a) at least one water-soluble monomer having at least one unsaturated functional group capable of being polymerized to form a water-soluble backbone and;
  b) at least one macromonomer of formula (I):

wherein, $R_1$, $R_2$ and $R_3$ are, independently, a hydrogen atom, a methyl group, $COZR_4$, $CH_2COZR_4$, $COO^-M^+$, $CH_2COO^-M^+$ or X—Y;

Z is $NR'_4$ or O;

$R_4$, $R'_4$ are, independently, a hydrogen atom or a carbon-based, saturated or unsaturated, optionally aromatic, linear, branched or cyclic radical comprising 1 to 30 carbon atoms and comprising 0 to 4 heteroatoms selected from the group comprising O, N and S;

$M^+$ is an alkali metal, an alkaline earth metal, or ammonium;

X is a hydrolyzable bond;

Y is an LCST group of which the aqueous solution transition temperature is in the range between 0 and 180° C. for a mass concentration of 1% of said group Y in deionized water.

The heat-sensitive copolymer comprises at least one water-soluble monomer and at least one monomer of formula (I). In other words, the heat-sensitive copolymer is a copolymer of at least one of each of these two types of monomers.

Diversion is taken to mean the temporary blockage of one or more areas in order to allow selective treatment of the underground formation. Due to the heterogeneous permeability of the formation, preferential passages exist by which the treatment tends to pass through. By using diverting means, the treatment is prevented from going into these preferential passages. This enables the treatment to be diverted towards the targeted areas. Since the diversion is temporary, it only lasts as long as the treatment duration. The initial permeability of the underground formation is re-established after the treatment.

The water-soluble backbone of the heat-sensitive copolymer may comprise at least one water-soluble monomer. Typically, the water-soluble monomer may be selected from the group comprising non-ionic monomers, anionic monomers, and mixtures of non-ionic monomers and anionic monomers.

The water-soluble monomer may be a non-ionic monomer notably being selected from the group comprising water-soluble vinyl monomers, and particularly acrylamide; N-isopropylacrylamide; N,N-dimethylacrylamide; N-vinylformamide; acryloyl morpholine; N,N-diethyl acrylamide; N-tert butyl acrylamide; N-vinylpyrrolidone; N-vinylcaprolactam; and diacetone acrylamide. Advantageously, the non-ionic monomer is acrylamide.

According to a particular embodiment, the heat-sensitive copolymer advantageously comprises between 1 and 99.9 mol % of non-ionic monomer(s), preferably between 40 and 95% and more preferably between 60 and 90 mol %, relative to the total number of monomers.

The water-soluble monomer may also be an anionic monomer. The anionic monomer(s) that may be used within the scope of the invention may be selected from a wide group. These monomers may have acrylic, vinyl, maleic, fumaric, malonic, itaconic, allylic functional groups and contain a carboxylate, phosphonate, phosphate, sulfate, sulfonate group or another anionic group. The anionic monomer may be in the form of an acid or in the form of an alkaline earth metal or alkali metal salt. Examples of suitable monomers comprise acrylic acid, methacrylic acid, itaconic acid, crotonic acid, maleic acid, fumaric acid and monomers of the strong acid type having for example a function of the sulfonic acid or phosphonic acid type, such as 2-acrylamido-2-methylpropane sulfonic acid, vinylsulfonic acid, vinylphosphonic acid, allylsulfonic acid, allylphosphonic acid, styrenesulfonic acid, and the water-soluble alkali metal, alkaline earth metal, or ammonium salts thereof.

According to a particular embodiment, the heat-sensitive copolymer advantageously comprises between 1 and 99 mol % anionic monomer(s), preferably between 3 and 80 mol % and more preferably between 5 and 50 mol %, relative to the total number of monomers.

Optionally, the copolymer backbone may comprise at least one cationic monomer.

The water-soluble monomer may optionally be a cationic monomer of the acrylamide, acrylic, vinyl, allyl or maleic type having an amine or quaternary ammonium function. Mention may be made, in particular and in a non-limiting way, of quaternized or salified dimethylaminoethyl acrylate, and dimethylaminoethyl methacrylate, dimethyldiallylammonium chloride (DADMAC), acrylamido propyltrimethyl ammonium chloride (APTAC) and methacrylamido propyltrimethyl ammonium chloride (MAPTAC).

Thus, according to a particular embodiment, the heat-sensitive copolymer advantageously comprises between 1 and 99 mol % cationic monomer(s), preferably between 3 and 80 mol %, and more preferably between 5 and 50 mol %, relative to the total number of monomers.

As previously indicated, the macromonomer(s) of formula (I) contain an X group, which is a hydrolyzable bond of the ester or amide type.

The hydrolyzable bond is advantageously X is advantageously an ester bond (C=O)—O— or an amide bond (C=O)—NR" where R"=H or $CH_3$.

This is advantageously an ester function.

This hydrolyzable bond breaks down so as to dissociate the Y group from the macromolecule of formula (I) over time. In other words, it causes breakage of the bond X between the water-soluble backbone and the side groups.

The heat-sensitive polymer thus loses its gelation properties.

Taking account of this hydrolyzable function and the presence of an LCST unit, the copolymer implements the two-fold advantage of breaking down over time in the presence of water, and of being heat-sensitive, that is to say of being able to thicken a solution as a function of temperature. There is therefore no need to co-inject a cross-linking agent or gelling additives, nor any agents to destroy it.

According to an advantageous embodiment, the molar percentage of macromonomers of formula (I) in the heat-sensitive copolymer is in the range of 0.1 to 10 mol %, preferably between 0.5 and 5 mol %, relative to the total number of monomers.

According to the general knowledge of a person skilled in the art, LCST groups correspond to groups whose water solubility for a determined concentration is modified beyond a certain temperature and as function of the salinity. These are groups having a heating transition temperature defining their lack of affinity with the solvent medium. The lack of affinity with the solvent results in opacification or loss of transparency, which may be due to precipitation, aggregation, gelification, or viscosification of the medium. The minimum transition temperature is known as "LCST" (Lower Critical Solution Temperature). For each concentration of the LCST group, a heating transition temperature is observed. It is greater than the LCST which is the minimum point in the curve. Below this temperature, the polymer is soluble in water, above this temperature, the polymer loses its solubility in water.

Usually, the measurement of the LCST is carried out visually: the temperature at which the lack of affinity with the solvent appears is determined, that is to say the cloud point. The cloud point corresponds to the opacification of the solution or the loss of transparency.

The LCST may also be determined depending on the phase transition type for example by DSC (differential scanning calorimetry), by measurement of the transmittance or by measurement of viscosity.

Preferably, the LCST is determined by determining the cloud point by transmittance according to the following protocol:

The transition temperature is measured for the group Y for a solution having a mass concentration in deionized water of 1% by weight of said Y groups. The cloud point corresponds to the temperature at which the solution has a transmittance equal to 85% or less, at a wavelength of between 400 and 800 nm.

In other words, the temperature at which the solution has a transmittance equal to 85% or less corresponds to the minimum transition temperature LCST of the group Y.

Generally, a transparent composition has a maximum light transmittance value, regardless of the wavelength between 400 and 800 nm, through a sample 1 cm thick, of at least 85%, preferably of at least 90%. This is the reason why the cloud point corresponds to a transmittance of 85% or less.

Generally, the macromonomer of formula (I) does not require development of a particular method. Indeed, it may be obtained according to techniques known to a person skilled in the art. It is generally synthesized in two steps that may be reversed. More precisely, it is possible to select a vinyl group, to functionalize it in a first step to then grow an LCST Y group in a second step. The functionalized monomers are for example hydroxypropyl acrylate, hydroethyl methacrylate, glycidyl ether methacrylate. The macromolecules that may be grown are for example alkylene oxides or amines, by ionic polymerization techniques.

Alternatively, it is possible to synthesize the LCST Y group with a functional end, then graft it to the ethylene group.

Mention may be made by way of example of the macromonomer synthesis from the group Y having controlled size and functionality, carried out using a radical or ionic initiator having the desired chemical function, and/or by introducing a transfer agent substituted by the desired chemical group and/or by polycondensation.

In a first step, mention may be made of telomerization, which is a way of synthesizing LSCT Y groups with low molar mass (known as telomers). Telogenic agents may be selected from thiols, alcohols, disulfides, phosphorous derivatives, boron derivatives and halogenated derivatives. They may notably allow the introduction of specific functional groups at the end of the telomeric chains, for example silane, trialkyloxysilane, amine, epoxy, hydroxyl, phosphonate, or acid functions.

Once these LCST Y groups have been formed, in a second step a vinyl double bond may be introduced at the end of the chain such that they enable, in turn, the macromonomers to be polymerized.

Many reactions may be used to couple the monomers, e.g. alkylation, esterification, amidation, transesterification or transamidation.

According to an advantageous embodiment, the LCST Y groups of the heat-sensitive copolymer may be constituted by one or more units selected from the following units:
polyethers such as poly(ethylene oxide) (PEO), poly (propylene oxide) (PPO), statistical copolymers of ethylene oxide (EO) and propylene oxide (PO); C10-C12 (fatty acid poly-glycol ether) (Marlox® KF69, Biodac® 2-32);
telomeric derivatives based on N- or N,N-substituted acrylamide having an LCST as defined above, such as telomeric derivatives of N,N-diethylacrylamide, telomeric derivatives of N,N-dimethylacrylamide, telomeric derivatives of N-isopropylacrylamide, telomeric derivatives of N-vinylcaprolactam, and telomeric derivatives of acryloylmorpholine.

According to a particular embodiment, the macromonomer may be of formula (II):

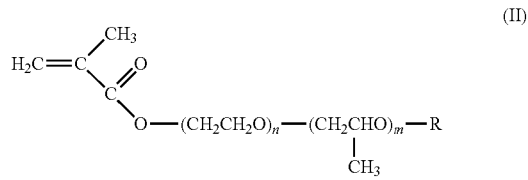

wherein:
n and m are integers that are, independently from each other, advantageously between 2 and 40, where the $(CH_2CH_2O)$ and $(CH_2CHCH_3O)$ units can be distributed in blocks or in a random manner.

According to a particular embodiment, the macromonomer may be of formula (III):

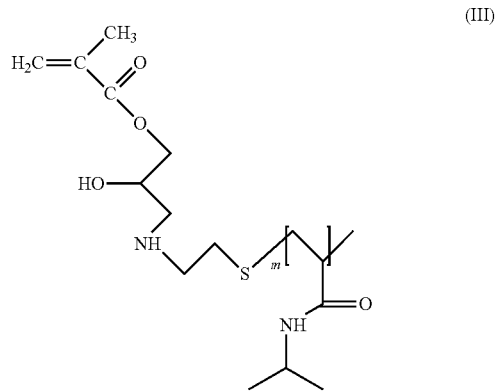

Wherein:
m is an integer advantageously between 2 and 40.

As already indicated, the LCST groups of the heat-sensitive copolymer have a heating transition temperature of 0 to 180° C. for a mass concentration in deionized water of 1% by weight of said LCST groups.

The heat-sensitive copolymer has, for a given mass concentration in aqueous solution and above a given critical temperature, viscosification properties or thermoviscosification properties.

The viscosification properties by heating observed above the transition temperature of the LCST chains are due to the association of the sticking points between the main chains.

The viscosifying properties are observed above the transition temperature and when the polymer in solution concentration is sufficient to allow interactions between the LCST groups carried by the various macromolecules. The minimum concentration necessary, known as critical aggregation concentration or CAC, is evaluated by rheology measurements. It corresponds to the concentration above which the viscosity of an aqueous solution of heat-sensitive copolymer becomes greater than the viscosity of an equivalent polymer solution not having any LCST groups.

In the method according to the invention, the diversion is carried out by injection of the aqueous solution containing the heat-sensitive polymer into the area to be temporarily blocked. It is the gradual change up to the temperature of the underground formation that enables viscosification. It is generally between 20 and 200° C.

The thickening effect of the heat-sensitive copolymer can be adapted to the nature of the underground formation (temperature) notably according to the nature of the group Y and of the molar quantity of macromonomer, the salinity and/or pH of the water used to prepare the aqueous solution to be injected, and the copolymer concentration.

According to an advantageous embodiment, the heat-sensitive copolymer has a viscosification temperature advantageously between 25 and 140° C., preferably between 30 and 120° C., and even more advantageously between 40 and 100° C.

Typically, the aqueous solution used in the diverting method according to the invention comprises between 50 and 50,000 ppm by weight of at least one heat-sensitive copolymer, more advantageously between 100 and 30,000 ppm, and even more advantageously between 500 and 10,000 ppm relative to the weight of the aqueous polymeric solution injected.

Advantageously, viscosification instantaneously takes place once the diverting fluid has reached the viscosification temperature of the polymer, after injection into the underground formation to be treated.

According to the invention, the polymer used may have a linear, branched, cross-linked, star-shaped or comb-shaped structure. These structures may be obtained by the selection of the initiator, transfer agent, polymerization technique, such as controlled radical polymerization known as RAFT (reversible-addition fragmentation chain transfer), NMP (nitroxide-mediated polymerization) or ATRP (atom-transfer radical polymerization), incorporation of structural monomers, or concentration, etc.

Generally, the heat-sensitive copolymer does not require the development of any particular polymerization method. Indeed, it may be obtained according to polymerization techniques known by a person skilled in the art. It may notably be solution polymerization, gel polymerization, precipitation polymerization, emulsion polymerization (aqueous or inverse), suspension polymerization, or micellar polymerization.

The heat-sensitive copolymer may be in the form of a liquid, gel or solid when its preparation includes a drying step such as spray drying, tumble drying, microwave drying or even fluidized bed drying.

According to one embodiment of the invention, the heat-sensitive copolymer may be obtained by copolymerization of at least one water-soluble monomer and at least one macromonomer of formula (I).

A person skilled in the art knows that the heat-sensitive copolymer may be obtained by grafting LCST units onto a copolymer. In this case, it is not copolymerization of a monomer having said LCST units. The introduction of LSCT units is carried out once the polymer has been synthesized. Mention may be made of patent WO2014047243 which describes this technique.

Advantageously, the heat-sensitive copolymer has a molecular weight of between 100,000 and 25,000,000 g/mol, preferably between 250,000 and 20,000,000 g/mol and even more preferably between 750,000 and 15,000,000 g/mol.

In a surprising manner, the Applicant has discovered that the heat-sensitive copolymer described above is particularly suitable to be used in diverting gels, due to the specific temperature of association of its units and of its spontaneous viscosification without requiring an activating agent.

Without wishing to issue a particular theory, it would appear that the specific selection of the monomers/macromonomers enables a particular technical effect to be achieved. Indeed, at the surface, at ambient temperature, the polymer solution is not very viscous and remains easily injectable. The polymer in solution is not very sensitive to mechanical or chemical degradation and may be simply prepared in cold water at high concentrations. At the bottom of wells, when the temperature changes, the Y groups having reached their LCST interact. This causes a sudden increase in the viscosity of the solution. This solution has a sufficiently high viscosity at this temperature to allow diversion for a subsequent chemical treatment. After a certain amount of time, the hydrolyzable bond of the macromonomer hydrolyzes and the Y groups no longer participate in the formation of a viscous solution. A gradual reduction in the viscosity occurs until it completely disappears after a few days, thus making the well free for production without reducing its permeability, without the addition or co-injection or post-treatment of a gel-breaking agent, encapsulated or otherwise.

The invention also relates to a method for diverting an oil-bearing underground formation comprising:
- the diverting method according to the present invention, that is to say the injection into an underground formation of an aqueous solution comprising at least one heat-sensitive copolymer as described above;
- the subsequent injection of an aqueous treatment solution into the underground formation;
- the self-degradation of the heat-sensitive copolymer.

According to the invention, the treatment operations may include for example, fracturing operations, gravel packing operations, acidification treatment operations, dissolution and removal of limestone operations, or the treatment of consolidation, the injection of biocide, anti-redeposition agent, sand encroachment prevention.

The invention and the benefits that flow from it will be clearer upon reading the following figures and examples, given to illustrate the invention and not to limit it in any way.

FIGURES

EMBODIMENTS OF THE INVENTION

Synthesis of a Heat-Sensitive Copolymer Having an LCST Unit

This synthesis is carried out in two steps which consist respectively of preparing a macromonomer and a copolymer by copolymerization of this macromonomer.

1. Synthesis of the Macromonomer with LCST Unit of Formula:

The transition temperature of Biodac 2-32 (group Y) as defined is from 34-36° C.

340.6 g DMF (dimethylformamide), 91.9 g methacrylic anhydride and 0.2042 g EMHQ (hydroquinone monomethyl ester) were loaded into a 1 L reactor. Via a dropping funnel, 367.3 g Biodac 2-32 (fatty acid polyglycol ether) was added over 3 hours, the solution was then heated to 60° C. for 2 hours, then the DMF was evaporated off at 60° C. under 200 pascals (2 millibars).

2. Synthesis of the Heat-Sensitive Copolymer:

The copolymer is prepared by radical polymerization. The following were loaded into a 1.5 L adiabatic reactor: 48.27 g previously-prepared macromonomer, 375 g AMPS, 282.2 g acrylamide and 578.32 g water.

After degassing with nitrogen for 10 min, the addition of a reducing-oxidizing couple Mohr's salt—sodium persulfate as well as an azo initiator Va 044 (2,2'-azobis(2-(2-imidazolin-2-yl)propane) dihydrochloride) initiates copolymerization.

The final product is obtained by milling and drying the gel.

3. Viscosity as a Function of Time or Temperature

Figure 1:
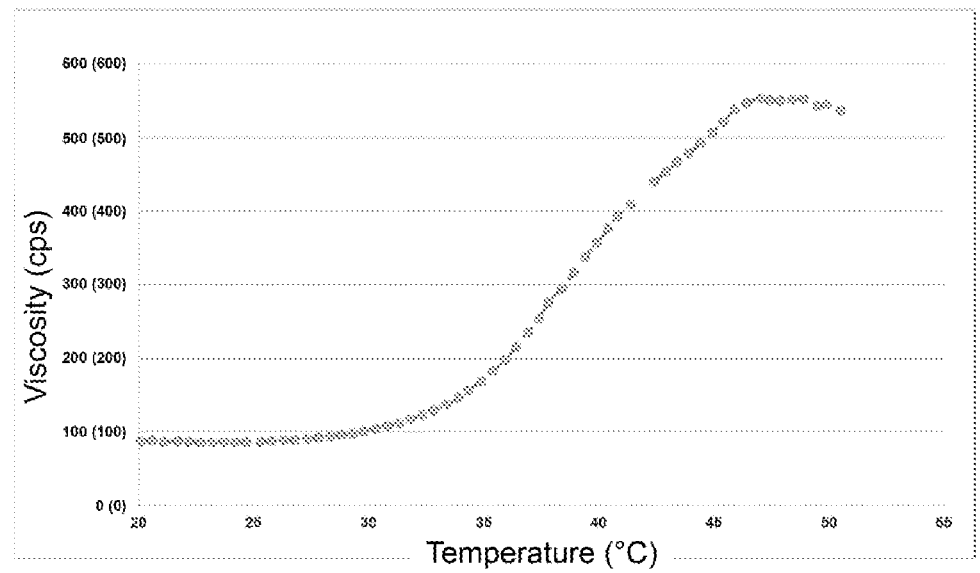
FIG. 1 illustrates the viscosity of a heat-sensitive copolymer having an LCST unit, as a function of temperature.

FIG. 1 shows how the viscosity of an aqueous solution at 4% by weight of KCl and 5000 ppm (by weight) of the heat-sensitive copolymer evolves, as a function of temperature.

Figure 2:
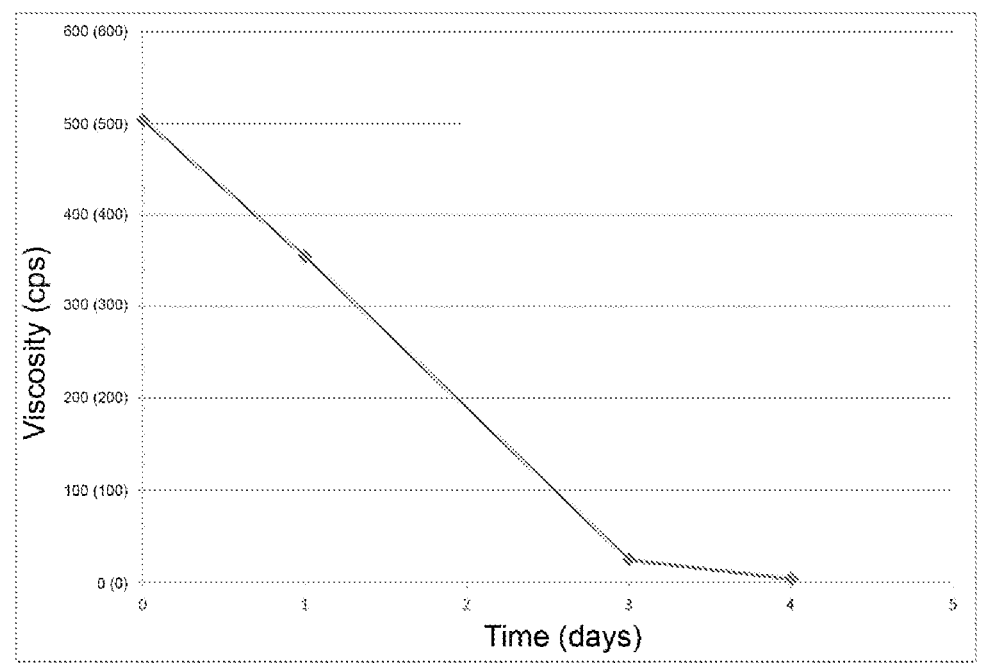
FIG. 2 illustrates the viscosity of a heat-sensitive copolymer having an LCST unit, as a function of time and at constant temperature.

FIG. 2 shows how the viscosity of this polymeric solution, held at a temperature of 71° C., evolves as a function of time. It falls sharply from 500 mPa·s to around 350 mPa·s (from 500 cps to around 350 cps) after one day. It is almost zero after 4 days.

The viscosity of the polymer solution is measured using a Bohlin rheometer (cone plate, 2° 60 mm, 7.34 s$^{-1}$).

The invention claimed is:

1. A method for diverting an underground formation, the method comprising:
   injecting into the underground formation an aqueous solution comprising at least one heat-sensitive copolymer of:
   a) at least one water-soluble monomer having at least one unsaturated functional group capable of being polymerized to form a water-soluble backbone and;
   b) at least one macromonomer of formula (I):

wherein,
   $R_1$, $R_2$ and $R_3$ are, independently, a hydrogen atom, a methyl group, $COZR_4$, $CH_2COZR_4$, $COO^-M^+$, $CH_2COO^-M^+$ or X—Y;
   Z is $NR'_4$ or O;
   $R_4$, $R'_4$ are, independently, a hydrogen atom or a carbon-based, saturated or unsaturated, optionally aromatic, linear, branched or cyclic radical comprising 1 to 30 carbon atoms and comprising 0 to 4 heteroatoms selected from the group comprising O, N and S;
   $M^+$ is an alkali metal, an alkaline earth metal, or ammonium;
   X is a hydrolyzable ester or amide bond;
   Y is an LCST group of which the aqueous solution transition temperature is in the range between 0 and 180° C. for a mass concentration of 1% of said group Y in deionized water,
   thereby enabling treatment liquid in the underground formation to be diverted to an area to be treated,
   wherein:
   the heat-sensitive copolymer has a viscosification temperature between 25 and 140° C.; and
   at the time of the injecting into the underground formation, the heat-sensitive copolymer has not yet viscosified as it would when subject to the viscosification temperature, and the heat-sensitive copolymer viscosifies and blocks a targeted area after being injected into the underground formation.

2. The method according to claim 1, wherein the water-soluble monomer is selected from the group consisting of non-ionic monomers, anionic monomers, and mixtures of non-ionic monomers and anionic monomers.

3. The method according to claim 1, wherein the water-soluble monomer is a non-ionic monomer selected from the group consisting of acrylamide, N-isopropylacrylamide; N,N-dim ethyl acryl amide; N-vinylformamide; acryloyl morpholine; N,N-diethyl acrylamide; N-tert butyl acrylamide; N-vinylpyrrolidone; N-vinyl caprolactam; and diacetone acrylamide.

4. The method according to claim 1, wherein the water-soluble monomer is an anionic monomer selected from the group consisting of: acrylic acid, methacrylic acid, itaconic acid, crotonic acid, maleic acid, fumaric acid, 2-acrylamido 2-methylpropane sulfonic acid, vinylsulfonic acid, vinylphosphonic acid, allylsulfonic acid, allylphosphonic acid, styrenesulfonic acid, and the alkali metal, alkaline earth metal or ammonium salts thereof.

5. The method according to claim 1, wherein the hydrolyzable bond X is an ester bond.

6. The method according to claim 1 wherein the heat-sensitive copolymer comprises between 0.1 and 10 mol % of macromonomer of formula (I), relative to the total number of monomers.

7. The method according to claim 1 wherein the heat-sensitive copolymer comprises between 0.5 and 5 mol % of macromonomer of formula (I), relative to the total number of monomers.

8. The method according to claim 1 wherein the group Y is selected from the group consisting of polyethers and telomeric derivatives based on N- or N,N-substituted acrylamide derivatives.

9. The method according to claim 1 wherein the group Y is selected from the group consisting of poly(ethylene oxide) (PEO), poly(propylene oxide) (PPO), statistical copolymers of ethylene oxide (EO) and propylene oxide (PO); telomeric derivatives of N,N-diethylacrylamide, telomeric derivatives of N,N-dimethylacrylamide, telomeric derivatives of N-isopropylacrylamide, telomeric derivatives of N-vinylcaprolactam, and telomeric derivatives of acryloylmorpholine.

10. The method according to claim 1, wherein the macromonomer is of formula (I):

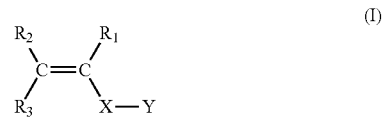

wherein:
$R_1$ is $CH_3$;
$R_2$ is H;
$R_3$ is H;
X is a hydrolyzable ester bond;

Y is constituted of poly (ethylene oxide) units $(CH_2CH_2O)_n$ and poly (propylene oxide) units $(CH_2CHCH_3O)_m$; and n and m are integers that are, independently from each other, between 2 and 40, the $(CH_2CH_2O)$ and $(CH_2CHCH_3O)$ units capable of being distributed together or in a random manner.

11. The method according to claim 1, wherein the macromonomer is of formula (III):

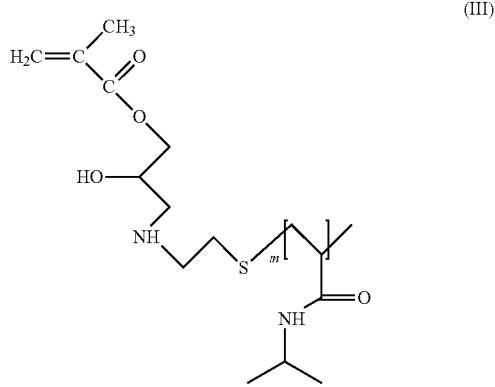

wherein:
m is an integer between 2 and 40.

12. The method according to claim 1 wherein the aqueous solution injected comprises between 50 and 50,000 ppm by weight of heat-sensitive copolymer.

13. A treatment method of an underground formation comprising successively:
performing the method for diverting an underground formation according to claim 1;
injecting an aqueous treatment solution into the underground formation; and
self-degradation of the heat-sensitive copolymer.

14. The method according to claim 10, wherein the water-soluble monomer is a non-ionic monomer selected from the group consisting of acrylamide, N-isopropylacrylamide; N,N-dim ethyl acryl amide; N-vinylformamide; acryloyl morpholine; N,N-diethyl acrylamide; N-tert butyl acrylamide; N-vinylpyrrolidone; N-vinyl caprolactam; and diacetone acrylamide.

15. The method according to claim 10, wherein the water-soluble monomer is an anionic monomer selected from the group consisting of: acrylic acid, methacrylic acid, itaconic acid, crotonic acid, maleic acid, fumaric acid, 2-acrylamido 2-methylpropane sulfonic acid, vinylsulfonic acid, vinylphosphonic acid, allylsulfonic acid, allylphosphonic acid, styrenesulfonic acid, and the alkali metal, alkaline earth metal or ammonium salts thereof.

16. The method according to claim 10 wherein the heat-sensitive copolymer comprises between 0.1 and 10 mol % of macromonomer of formula (I), relative to the total number of monomers.

17. The method according to claim 11, wherein the water-soluble monomer is a non-ionic monomer selected from the group consisting of acrylamide, N-isopropylacrylamide; N,N-dimethyl acryl amide; N-vinylformamide; acryloyl morpholine; N,N-diethyl acrylamide; N-tert butyl acrylamide; N-vinylpyrrolidone; N-vinyl caprolactam; and diacetone acrylamide.

18. The method according to claim 11, wherein the water-soluble monomer is an anionic monomer selected from the group consisting of: acrylic acid, methacrylic acid, itaconic acid, crotonic acid, maleic acid, fumaric acid, 2-acrylamido 2-methylpropane sulfonic acid, vinylsulfonic acid, vinylphosphonic acid, allylsulfonic acid, allylphosphonic acid, styrenesulfonic acid, and the alkali metal, alkaline earth metal or ammonium salts thereof.

19. The method according to claim 11 wherein the heat-sensitive copolymer comprises between 0.1 and 10 mol % of macromonomer of formula (III), relative to the total number of monomers.

20. The method according to claim 1, wherein the heat-sensitive copolymer comprises, relative to the total number of monomers, between 0.5 and 5 mol % of macromonomer of:
formula (I):

wherein:
$R_1$ is $CH_3$;
$R_2$ is H;
$R_3$ is H;
X is a hydrolyzable ester bond;
Y is constituted of poly (ethylene oxide) units $(CH_2CH_2O)_n$ and poly (propylene oxide) units $(CH_2CHCH_3O)_m$; and
n and m are integers that are, independently from each other, between 2 and 40, the $(CH_2CH_2O)$ and $(CH_2CHCH_3O)$ units capable of being distributed together or in a random manner; or
formula (III):

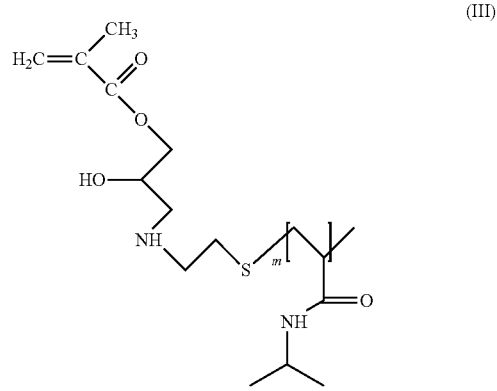

wherein:
m is an integer between 2 and 40.

* * * * *